United States Patent
Sadakane et al.

(10) Patent No.: US 7,124,737 B2
(45) Date of Patent: Oct. 24, 2006

(54) INJECTION CONTROLLER FOR INTERNAL COMBUSTION ENGINE

(75) Inventors: Shinji Sadakane, Toyota (JP);
Tomihisa Tsuchiya, Toyota (JP);
Takuya Ikoma, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/030,137

(22) Filed: Jan. 7, 2005

(65) Prior Publication Data
US 2005/0166896 A1 Aug. 4, 2005

(30) Foreign Application Priority Data
Jan. 13, 2004 (JP) ............... 2004-005936

(51) Int. Cl.
F02B 7/00 (2006.01)
F02B 7/02 (2006.01)

(52) U.S. Cl. ...................... 123/431; 123/299

(58) Field of Classification Search .......... 123/431, 123/299, 300; 701/103, 104
See application file for complete search history.

(56) References Cited

U.S. PATENT DOCUMENTS

| | | | | |
|---|---|---|---|---|
| 5,875,743 A | * | 3/1999 | Dickey | .......... 123/25 C |
| 5,924,405 A | * | 7/1999 | Hashimoto | .......... 123/431 |
| 6,679,224 B1 | * | 1/2004 | Stanglmaier | .......... 123/431 |
| 6,928,983 B1 | * | 8/2005 | Mashiki | .......... 123/431 |
| 2005/0178360 A1 | * | 8/2005 | Satou | .......... 123/431 |

FOREIGN PATENT DOCUMENTS

| | | |
|---|---|---|
| JP | A-63-138120 | 6/1988 |
| JP | U-06-053728 | 7/1994 |
| JP | A-10-339196 | 12/1998 |
| JP | A-2000-352335 | 12/2000 |
| JP | A-2001-020837 | 1/2001 |
| JP | A-2002-364409 | 12/2002 |

* cited by examiner

*Primary Examiner*—Mahmoud Gimie
(74) *Attorney, Agent, or Firm*—Oliff & Berridge, PLC

(57) ABSTRACT

An injection controller for an internal combustion engine that suppresses the accumulation of deposits on a nozzle hole of a direct injection valve. The injection controller includes the direct injection valve, which injects fuel into a cylinder, and an intake passage injection valve, which injects fuel into an intake passage. An ECU, which is connected to the direct injection and intake passage injection valves, executes a first fuel injection mode for injecting fuel with the direct injection valve and a second fuel injection mode for injecting fuel with the intake passage injection valve. The ECU switches fuel injection modes from the second fuel injection mode to the first fuel injection mode for a predetermined period when fuel is to be injected in the second fuel injection mode.

12 Claims, 3 Drawing Sheets

INJECTION CONTROLLER FOR INTERNAL COMBUSTION ENGINE

BACKGROUND OF THE INVENTION

The present invention relates to an injection controller for an internal combustion engine, and more specifically, relates to an injection controller for an internal combustion engine provided with a direct fuel injection valve, which injects fuel directly into the cylinder, and an intake passage fuel injection valve, which injects fuel into an intake passage.

Conventionally, certain internal combustion engines are provided with a direct injection valve (in-cylinder injection valve) for injecting fuel directly into the cylinder in addition to a port injection valve for injecting fuel into an intake port of an intake passage (for example, refer to Japanese Laid-Open Patent Publication No. 2002-364409). In such an internal combustion engine, the fuel injection is flexibly switchable in accordance with the engine operation conditions such that fuel injection is performed by only the port injection valve, fuel injection is performed by only the direct injection valve, and fuel injection is performed by both valves.

The direct injection valve includes a nozzle hole for injecting fuel. Since the direct injection valve is exposed to high-temperature combustion gas in the combustion chamber, deposits tend to adhere to the nozzle hole of the direct injection valve. When the direct injection valve is injecting fuel, the nozzle hole is cooled by vaporized fuel. However, when the direct injection valve is not injecting fuel, the nozzle hole is not cooled by vaporized fuel and the temperature of the nozzle hole increases such that deposits accumulate on the nozzle hole. Such deposits obstruct the injection of fuel from the nozzle hole of the direct injection valve. As a result, the shape of fuel mist may change (particle diameter increases) or the amount of injected fuel may decreases so as to be less than the amount required. There is concern in this case that misfire and unsatisfactory combustion may occur.

In the apparatus described in Japanese Laid-Open Patent Publication No. 2002-364409, some of the injected fuel of the port injection valve is allocated to the direct injection valve even during the period of operation in which the port injection valve is used. In this case, the nozzle hole is cooled by the vaporized fuel and the accumulation of deposits is prevented.

In the method for allocating some of the injected fuel of the port injection valve to the direct injection valve described above, when the required amount of injected fuel is relatively low, the portion of the injected fuel allocated to the direct injection valve is also relatively small. Therefore, an adequate cooling effect is not obtained, and the accumulation of deposits is not sufficiently prevented.

When a small amount of injected fuel is required and the fuel allocated to the direct injection valve falls below the appropriate minimum amount (minimum value ensuring linearity of the injected amount relative to valve open time of the injection valve), the direct injection valve cannot inject fuel normally. In this case, there is concern that misfire and unsatisfactory combustion may occur.

SUMMARY OF THE INVENTION

It is an object of the present invention to provide an injection controller for internal combustion engines which ideally suppresses the accumulation of deposits on the nozzle hole of the direct injection valve.

One aspect of the present invention is a controller for controlling the injection of fuel in an internal combustion engine including a cylinder and an intake passage connected to the cylinder. The controller includes a direct injection valve for injecting fuel into the cylinder. An intake passage injection valve injects fuel into the intake passage. A switching means, connected to the direct injection valve and the intake passage injection valve, executes a first fuel injection mode with the direct injection valve and a second fuel injection mode with the intake passage injection valve. The switching means switches injection modes from the second fuel injection mode to the first fuel injection mode for a predetermined period when fuel is to be injected in the second fuel injection mode.

Another aspect of the present invention is a method for controlling fuel injection in an internal combustion engine including a cylinder and an intake passage connected to the cylinder. The method includes executing a first fuel injection mode for injecting fuel into a cylinder with a direct injection valve, executing a second fuel injection mode for injecting fuel into the intake passage with an intake passage injection valve, and switching fuel injection modes from the second fuel injection mode to the first fuel injection mode for a predetermined period when fuel is to be injected in the second fuel injection mode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

An injection controller 50 for an internal combustion engine 10 according to a first embodiment of the present invention will now be described with reference to FIGS. 1 and 2.

Figure 1:
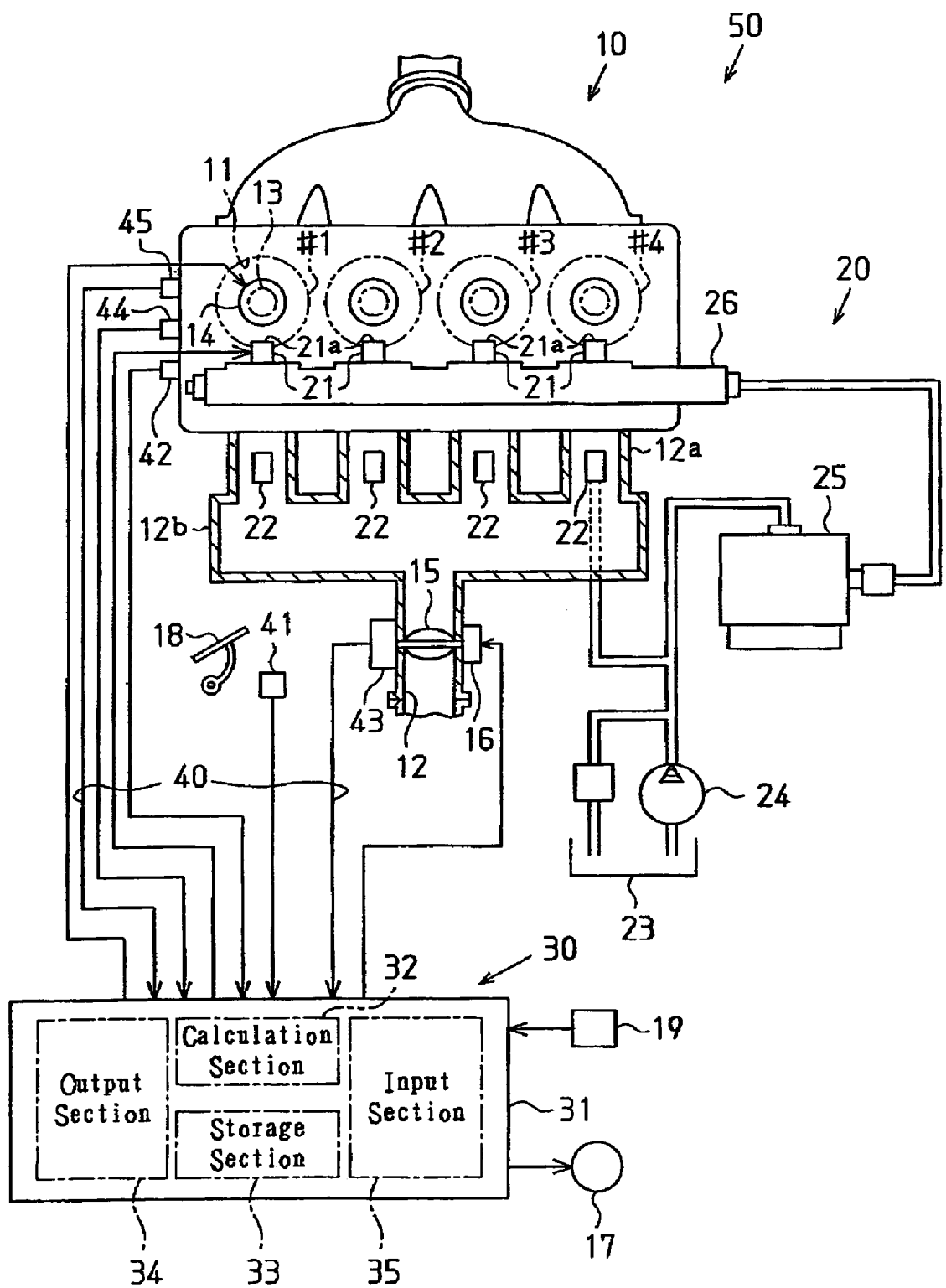
FIG. 1 is a schematic diagram showing an injection controller for an internal combustion engine according to a first embodiment of the present invention.

FIG. 1 is a schematic diagram showing the injection controller 50 of the first embodiment.

The injection controller 50 is provided with a fuel supply system 20 for supplying fuel to the internal combustion engine 10, a control system 30 for controlling fuel injection with the fuel supply system 20, and a detection system 40 having various types of sensors for providing the control system 30 with detection signals (some of the control data).

In the first embodiment, the internal combustion engine 10 has four cylinders #1 through #4. Each of the cylinders #1 through #4 includes a combustion chamber 11 connected to an intake passage 12. Specifically, the intake passage 12 includes four intake ports 12a, each of which is connected to a corresponding one of the combustion chambers 11, and a surge tank 12b connected to the intake ports 12a.

The fuel supply system 20 is provided with four direct injection valves 21, arranged in correspondence with the cylinders #1 through #4 to directly inject fuel into the combustion chambers 11 of the cylinders #1 through #4, and four intake passage injection valves 22 arranged in correspondence with the cylinders #1 through #4 to inject fuel into the intake passage 12. The intake passage injection valve 22 in the first embodiment is a port injection valve for injecting fuel into the corresponding intake port 12a. Alternatively, the intake passage injection valve 22 may inject fuel into the surge tank 12b (generally referred to as cold start injector). Hereinafter, the intake passage injection valve 22 is referred to as the "port injection valve 22."

Fuel stored in a fuel tank 23 is allocated to the direct injection valves 21 and the port injection valves 22. That is, the fuel in the fuel tank 23 is supplied to the port injection valves 22 by a feed pump 24. Some of the fuel pumped by the feed pump 24 is also supplied to the direct injection valves 21 through a delivery pipe 26 after being pressurized to a high pressure by a supply pump 25.

The direct injection valves 21 and the port injection valves 22 are each provided with an electromagnetic solenoid (not shown), which is connected to the control system 30. The control system 30 provides drive signals to each solenoid for setting the amount of fuel injection and time of fuel injection of the associated injection valve 21 and 22.

The internal combustion engine 10 is provided with a spark plug 13 for each of the cylinders #1 through #4. The spark plug 13 is connected to an igniter 14, provided with a built-in ignition coil (not shown), which is connected to the control system 30. The control system 3Q provides an ignition signal to the igniter 14 to set the ignition timing of the ignition coil.

A throttle valve 15 for regulating the amount of intake air drawn into each combustion chamber 11 through the intake passage 12 is provided in the intake passage 12 upstream of the surge tank 12b. A throttle motor 16, which is mounted on the throttle valve 15, is controlled by the control system 30. The opening of the throttle valve 15 is regulated by the throttle motor 16.

The control system 30, which is provided with an electronic control unit (hereinafter referred to as an "ECU") 31 for performing each type of operation control in the internal combustion engine 10, controls the electromagnetic solenoids of the direct injection valves 21 and the port injection valves 22, the igniters 14, and the throttle motor 16 with the ECU 31.

The ECU 31 includes a calculation section 32 for executing arithmetic processes, a storage section 33 for storing various kinds of control programs and data referred to when executing the programs, an output section 34 for outputting drive signals to the injection valves 21 and 22 (electromagnetic solenoids) and the like, and an input section 35 for inputting detection signals from the various types of sensors.

Connected to the output section 34 is a starter 17 for driving a crankshaft (not shown) of the internal combustion engine 10 during an engine starting operation until the internal combustion engine 10 is capable of spontaneous operation. The starter 17 begins the starting operation (cranking) when an ignition switch 19 connected to the ECU 31 is turned to the starting position.

The detection system 40 is provided with an acceleration sensor 41, a coolant temperature sensor 42, throttle sensor 43, a speed sensor 44, and a cylinder discrimination sensor 45.

The acceleration sensor 41 is provided near the accelerator pedal 18, and detects the amount of depression (accelerator opening) of the accelerator pedal. The coolant temperature sensor 42, which is located in a water jacket (not shown) of the internal combustion engine 10, detects the temperature of the engine coolant (engine coolant temperature). The throttle sensor 43 detects the opening of the throttle valve 15 (throttle opening). The detection signals of these sensors 41 through 43 are provided to the calculation section 32 after the signals are subjected to proper A/D (analog/digital) conversion in the input section 35.

The speed sensor 44, which is located near the crankshaft (not shown), generates a detection signal corresponding to the number of rotations of the crankshaft, and provides the detection signal to the input section 35. The cylinder discrimination sensor 45, which is located near a camshaft (not shown), generates detection signals corresponding to the rotation of the camshaft, and provides the detection signal to the input section 35. The input section 35 adjusts the waveform of the detection signals of the sensors 44 and 45 and generates pulse signals synchronized with the rotation of the crankshaft or camshaft. These pulse signals are sent to the calculation section 32. The calculation section 32 calculates the rotation speed (engine speed) and rotation phase angle (crank angle) of the crankshaft based on these pulse signals.

The ECU 31 detects the operating condition of the internal combustion engine 10 based on the detection signals from the acceleration sensor 41 and the speed sensor 44. The ECU 31 switches the fuel injection mode of the injection valves 21 and 22 in accordance with the engine operation conditions by driving at least either one of the direct injection valves 21 and the port injection valves 22. More specifically, the ECU 31 executes a first fuel injection mode with the direct injection valves 21 and a second fuel injection mode with the port injection valve 22. Furthermore, the ECU 31 is capable of injecting fuel using both the direct injection valves 21 and the port injection valves 22.

In the injection controller 50, fuel is only injected from the port injection valves 22 in the low coolant temperature range (cool time), in which it is difficult to vaporize the fuel mist, or in the low speed range (particularly the idling range), in which the piston speed is low. This is because when the direct injection valves 21 inject fuel while the engine is operating in the low coolant temperature range or the low speed range, the fuel mist configuration is adversely affected, such that combustion is more sluggish and the combustion state deteriorates more compared to when fuel is injected by the port injection valve 22.

Since the direct injection valve 21 is exposed to the high temperature combustion gas in the combustion chamber 11, deposits readily adhere to the nozzle hole 21a of each injection valve 21. The accumulation of deposits at the nozzle hole occurs more markedly particularly when fuel is injected only by the port injection valve 22. These deposits block fuel injection from the nozzle hole and reduce the amount of fuel injected by the direct injection valve 21. When the amount of fuel injected by the direct injection valve 21 is less than a proper value (required value), misfire and unsatisfactory combustion may occur.

The ECU 31 forcibly switches the fuel injection mode such that only the direct injection valve 21 injects fuel for a predetermined period based on predetermined conditions during the operating period in which fuel is injected by the port injection valve 22. Accordingly, accumulation of deposits on the nozzle hole 21a is suppressed, and accumulated deposits are eliminated. In the first embodiment, the forcible switching of the fuel injection mode specifically refers to switching the injection valve that is used to the direct injection valves 21.

Details of the switching control for switching the fuel injection mode for deposit prevention is described below with reference to FIG. 2.

In the first embodiment, the ECU 31 executes a control routine corresponding to the first processing mode to switch the fuel injection mode. This control routine is stored in the storage section 33 of the ECU 31.

Figure 2:
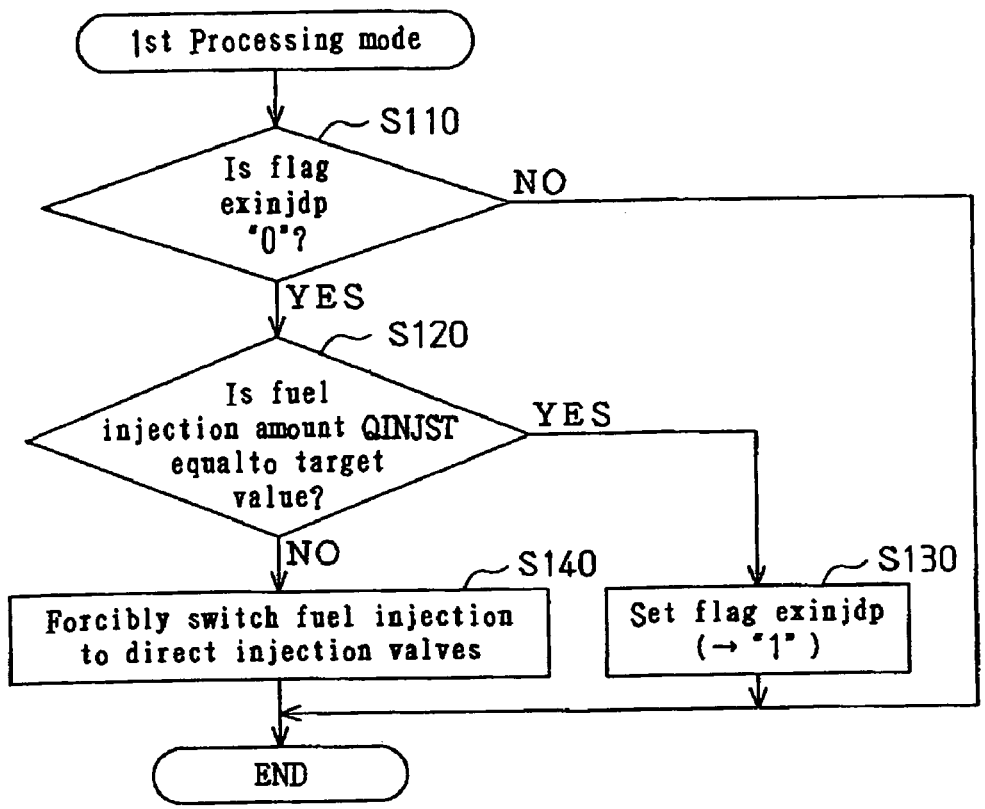
FIG. 2 is a flowchart showing a control routine in a first processing mode of the first embodiment.

FIG. 2 is a flowchart showing the control routine of the first processing mode. The first processing mode is designed for deposit prevention. In this mode, after the ignition switch 19 is turned ON, that is, after the engine starts, deposit prevention is accomplished by forcibly switching the injection valve for a predetermined period from the port injection valves 22 to the direct injection valves 21. This control routine is executed by the ECU 31 as, for example, an angle interrupt process at a predetermined crank angle. Although not shown in the drawing, when the ignition switch 19 is turned ON, the ECU 31 clears the mode control flag exinjdp (exinjdp→"0") as an initialization process in the control of the first processing mode.

When the process proceeds to this routine as an interrupt process, the ECU 31 first determines whether or not the mode control flag exinjdp is set at "0" (step S110). When the flag exinjdp is determined to be set at "1" at this time, the ECU 31 ends this process.

When the flag exinjdp is determined to be set at "0" (step S110: YES), the ECU 31 detects the fuel injection amount QINJST (actual fuel injection amount) of the direct injection valves 21 at this time, and determines whether or not the fuel injection amount QINJST has reached a target value (target injection amount), that is, whether or not the injection amount QINJST is low (step S120).

In the determination process, the ECU 31 detects the injection amount QINJST by, for example, detecting the change in the air-fuel ratio (A/F) learned value of the air-fuel mixture within the combustion chamber 11 (specifically, the corrected value of the fuel injection amount in the feedback control).

When the fuel injection amount QINJST is determined to be equal to the target value (step S120: YES), that is, when the injection amount QINJST is determined not to be low, the ECU 31 ends this process after setting the mode control flag exinjdp (exinjdp→"1") (step S130).

When it is determined that the fuel injection amount QINJST has not reached the target value (step S120: NO), that is, when it is determined that deposits have reduced the injection amount QINJST, the ECU 31 forcibly switches the injection valves from the port injection valves 22 to the direct injection valves 21. Then, fuel is injected from the direct injection valves 21 for a predetermined period (step S140).

Specifically, the ECU 31 switches the fuel injection mode such that the direct injection valves 21 corresponding to the cylinders #1 to #4 inject fuel for a predetermined cycle (for example, one cycle). In this way, deposits which accumulate at the nozzle hole 21a, that is, adhesion material such as carbon and the like which cause deposits (non-solids of deposits) may be blasted away by the force of the injection. As a result, the fuel injection amount QINJST of the direct injection valve 21 is restored to the target value. The ECU 31 temporarily ends the process after the direct injection valves 21 perform fuel injection.

Thereafter, when the process proceeds again to this routine (first processing mode) as an interrupt process, the ECU 31 determines whether or not the mode control flag exinjdp is set at "0" in step S110. When it is determined that the flag is set at "0" in step S110, the ECU 31 determines whether or not the fuel injection amount QINJST matches the target value in step S120. When the ECU 31 determines that the fuel injection amount QINJST does not match the target value, the injection valve is forcibly switched from the port injection valves 22 to the direct injection valves 21, which perform fuel injection for a predetermined period, in the same manner as described above.

In the first processing mode, when deposits accumulate at the nozzle hole 21a of each direct injection valve 21, the ECU 31 forcibly switches the injection valves to the direct injection valves 21. Accordingly, deposits that have accumulated at the nozzle hole 21a are blasted away and removed by the force of the injection. Furthermore, when the direct injection valve 21 performs fuel injection, the heat of fuel vaporization is expelled from the nozzle hole 21a, and the nozzle hole 21a is cooled. As a result, fresh accumulation of deposits at the nozzle hole 21a is prevented.

When the engine starts immediately after the ignition switch 19 is turned ON, the temperature of the nozzle hole 21a of the direct injection valve 21 and the temperature of the fuel injected from the direct injection valve 21 is lower than during normal engine operation. It has been confirmed through experiments that the deposit blasting effect is increased when the temperature of the nozzle hole 21a and fuel temperature are low (when the engine is cold). Accordingly, it is preferred that deposit prevention be performed when starting the engine during which the temperature of the nozzle hole 21a and the fuel temperature are low.

The injection controller 50 of the first embodiment has the advantages described below.

(1) The ECU 31 detects the fuel injection amount QINJST (actual fuel injection amount) of the direct injection valves 21. When the injection amount QINJST is less than the target value (target injection amount), the ECU 31 forcibly switches from the port injection valves 22 to the direct injection valves 21. Thus, the direct injection valve 21 injects fuel into the cylinders #1 through #4 for a predetermined cycle (one cycle in the present example). Accordingly, the deposits accumulated at the nozzle hole 21a of the direct injection valve 21 are blasted away by the force of the injection, and the injection amount QINJST is restored to the target value.

(2) The nozzle hole 21a is cooled when the associated direct injection valve 21 injects fuel. This suppresses accumulation of new deposits.

(3) When the fuel injection amount QINJST of the direct injection valve 21 is low, the ECU 31 forcibly switches to the direct injection valve 21 for a predetermined number of cycles until the injection amount QINJST recovers to the target value. The fuel injection by each direct injection valve 21 tends to cause insufficient homogenization of the air-fuel mixture. However, since the switching control is limited to the time until the injection amount recovers to the target value in the first embodiment, the adverse combustion caused by the fuel injected by the direct injection valve 21 is very slight.

(4) Since the ECU 31 switches to the direct injection valves 21 when the engine is started, the deposit blasted away by the fuel injection is very effective. That is, suitable deposit prevention is achieved.

The first embodiment may be variously modified as described below.

In the first embodiment, the ECU 31 detects the fuel injection amount QINJST of the direct injection valve 21 by detecting the change in an air-fuel ratio learned value. When the fuel injection amount is low, the ECU 31 performs the switching control to the direct injection valves 21 until the fuel injection amount QINJST recovers to the target value. Alternatively, the switching control also may be performed under the conditions described below. The deposit blasting effect is high when the temperature of the nozzle hole 21*a* and the fuel temperature are low as described above. Accordingly, the ECU 31 also may perform switching control when these temperatures are less than predetermined temperatures based on detection signals from sensors detecting the fuel temperature and the temperature of the nozzle hole 21*a*. In this case, deposit prevention is achieved during the time in which the blasting effect is high. In this case, sensors for directly detecting the nozzle hole temperature and fuel temperature may be used. Alternatively, the nozzle hole temperature and the fuel temperature may be estimated based on the coolant temperature detection result using the coolant temperature sensor 42.

Second Embodiment

A fuel injection controller 50 of an internal combustion engine 10 according to a second embodiment of the present invention will now be described with reference to FIGS. 3 and 4 focusing on parts differing from the first embodiment.

In the second embodiment, the ECU 31 executes a control routine corresponding to a second processing mode in addition to the control routine corresponding to the first processing mode of the first embodiment in order to switch the fuel injection mode. These control routines are stored in the storage section 33 of the ECU 31.

Figure 3:
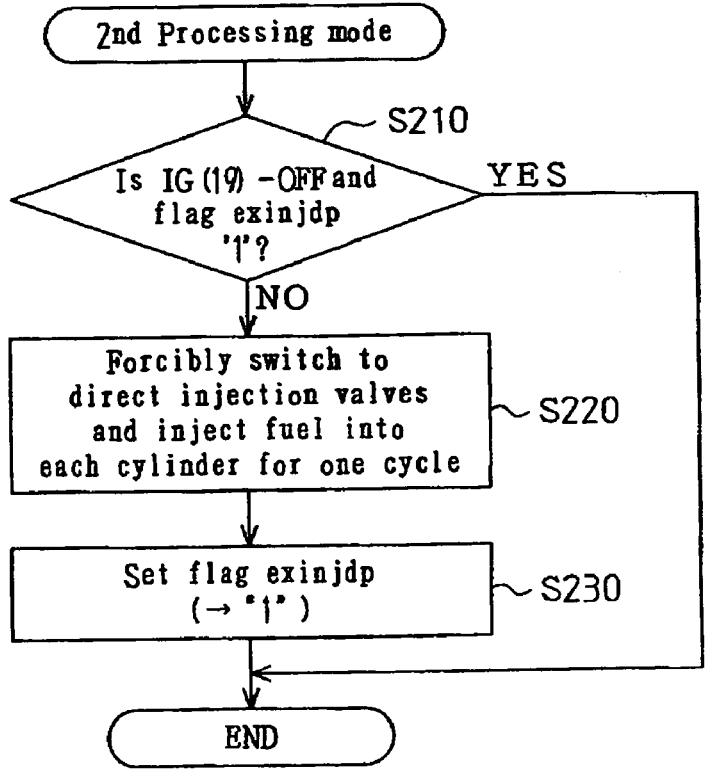
FIG. 3 is a flowchart showing a control routine in a second processing mode of a second embodiment.

FIG. 3 is a flowchart showing the control routine of the second processing mode. The second processing mode is designed for deposit prevention by forcibly switching the injection valve from the port injection valve 22 to the direct injection valve 21 until the engine stops after the ignition switch 19 is turned OFF based on the mode control flag exinjdp of the first processing mode. This control routine is executed through the ECU 31 as, for example, an angle interrupt process at a predetermined crank angle when the ignition switch 19 is turned OFF.

When the ignition switch 19 is turned OFF, the processing proceeds to the routine shown in FIG. 3 as an interrupt process. The ECU 31 first determines whether or not the mode control flag exinjdp is set at "1" (step S210). When it is determined that the mode control flag exinjdp is set at "1" (step S210: YES), the ECU 31 ends this process. That is, the ECU 31 has performed the deposit elimination process through the first processing mode when the mode control flag exinjdp is set at "1". In other words, the determination is that the fuel injection amount QINJST (actual fuel injection amount) has recovered to the target value (target injection amount). Then, the ECU 31 ends this process since deposit prevention through the second processing mode is unnecessary.

When it is determined that the mode control flag exinjdp is set at "0" (step S210: NO), the ECU 31 forcibly switches the injection valves from the port injection valves 22 to the direct injection valves 21, and the direct injection valves 21 performs fuel injection for a predetermined period (step S220). That is, when the mode control flag exinjdp is set at "0", the ECU 31 determines that there is a possibility that deposits have accumulated and thus performs fuel injection with the direct injection valves 21.

Specifically, the ECU 31 switches the fuel injection mode so that fuel is injected by the direct injection valves 21 corresponding to the cylinders #1 through #4 for one cycle. In this way, deposits which accumulate at the nozzle hole 21*a*, that is, adhesion material such as carbon and the like which cause deposits (non-solids of deposits) can be blasted away by the force of the injection. As a result, the fuel injection amount QINJST of the direct injection valve 21 is restored to the target value. After the direct injection valve 21 performs fuel injection in this way, the ECU 31 sets the mode control flag exinjdp to "1", and ends the process (step S230).

In the second processing mode, when the engine has stopped after the ignition switch 19 is turned OFF, the ECU 31 forcibly switches the injection valves to the direct injection valves 21. Accordingly, the deposits accumulated at each nozzle hole 21*a* of the direct injection valve 21 are removed. Furthermore, when the direct injection valve 21 performs fuel injection, the heat of fuel vaporization is expelled from the nozzle hole 21*a*, and the nozzle hole 21*a* is cooled. As a result, the accumulation of new deposits at the nozzle hole 21*a* is prevented.

When the engine is stopped, the effects of adverse combustion during use of the direct injection valves 21 are negligible. Therefore, it is preferred that such deposit prevention be performed when the engine is stopped.

Figure 4:
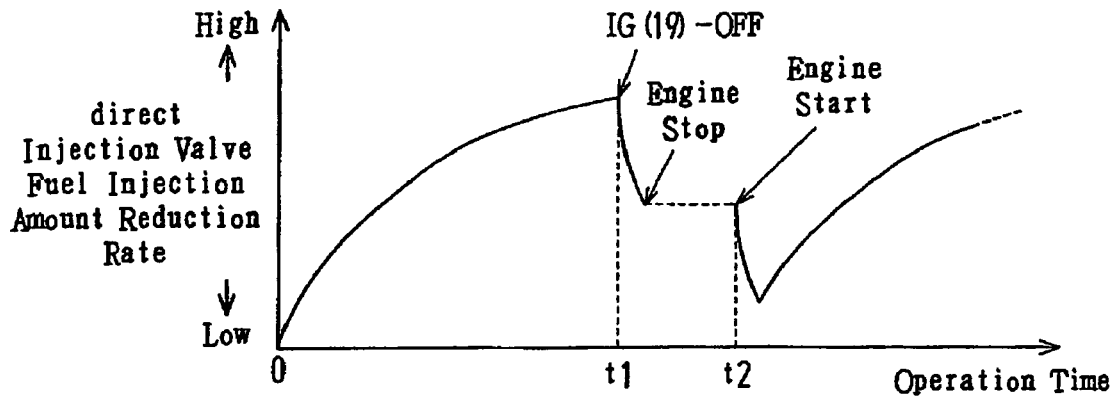
FIG. 4 is a graph showing the relationship between the engine operation time and the injection amount decrease rate of the direct injection valve.

FIG. 4 is a graph showing the relationship between the engine operation time and injection amount reduction rate of the direct injection valves 21 when executing controls to switch the fuel injection modes in the first processing mode and the second processing mode.

As shown in FIG. 4, the injection amount reduction rate of the direct injection valve 21 gradually rises as the engine operation time becomes longer. After the ignition switch is turned OFF at time t1, the ECU 31 executes the second processing mode. The ECU 31 restores the injection amount reduction rate by forcibly switching the injection valves to the direct injection valves 21 until the engine stops.

After the engine is started at time t2 (ignition switch 19 turned ON), the first processing mode is executed, and the injection valve is forcibly switched to the direct injection valve 21. As a result, deposits accumulated at the nozzle hole 21*a* of the direct injection valve 21 are removed, thereby restoring the injection amount reduction rate.

In addition to the advantages of the first embodiment, the injection controller 50 of the second embodiment has the advantages described below.

(1) After the ignition switch 19 is turned OFF, the ECU 31 forcibly switches the injection valves from the port injection valves 22 to the direct injection valves 21. The direct injection valves 21 corresponding to the cylinders #1 through #4 inject fuel for one cycle, and then the engine stops. Deposits accumulated at the nozzle hole 21*a* of the direct injection valve 21 are blasted away by the force of the injection, and the injection amount QINJST of the direct injection valve 21 is restored to the target value.

(2) Each nozzle hole 21*a* is cooled when the corresponding direct injection valve 21 performs fuel injection in the same manner as in the first embodiment. Accordingly, the accumulation of new deposits is suppressed when the engine stops.

(3) When the engine is stopped, the effects of adverse combustion when using the direct injection valve 21 are negligible. Since the ECU 31 switches to the injection valves 21 when the engine is stopped, deposit prevention is performed in an optimal manner.

The second embodiment may be modified as described below.

In the second embodiment, the process of the second processing mode is linked to the mode control flag exinjdp of the first processing mode. Alternatively, when the ignition switch 19 is turned OFF, the ECU 31 also may execute the switching control of the second processing mode regardless of the value of the flag exinjdp. Deposit prevention is performed when the engine is stopped and adverse combustion is negligible.

Third Embodiment

A fuel injection controller 50 of an internal combustion engine 10 according to a third embodiment of the present invention will now be described with reference to FIG. 5 focusing on parts differing from the first and second embodiments.

In the third embodiment, the ECU 31 executes a control routine corresponding to a third processing mode to switch the fuel injection mode. This control routine is stored in the storage section 33 of the ECU 31.

Figure 5:
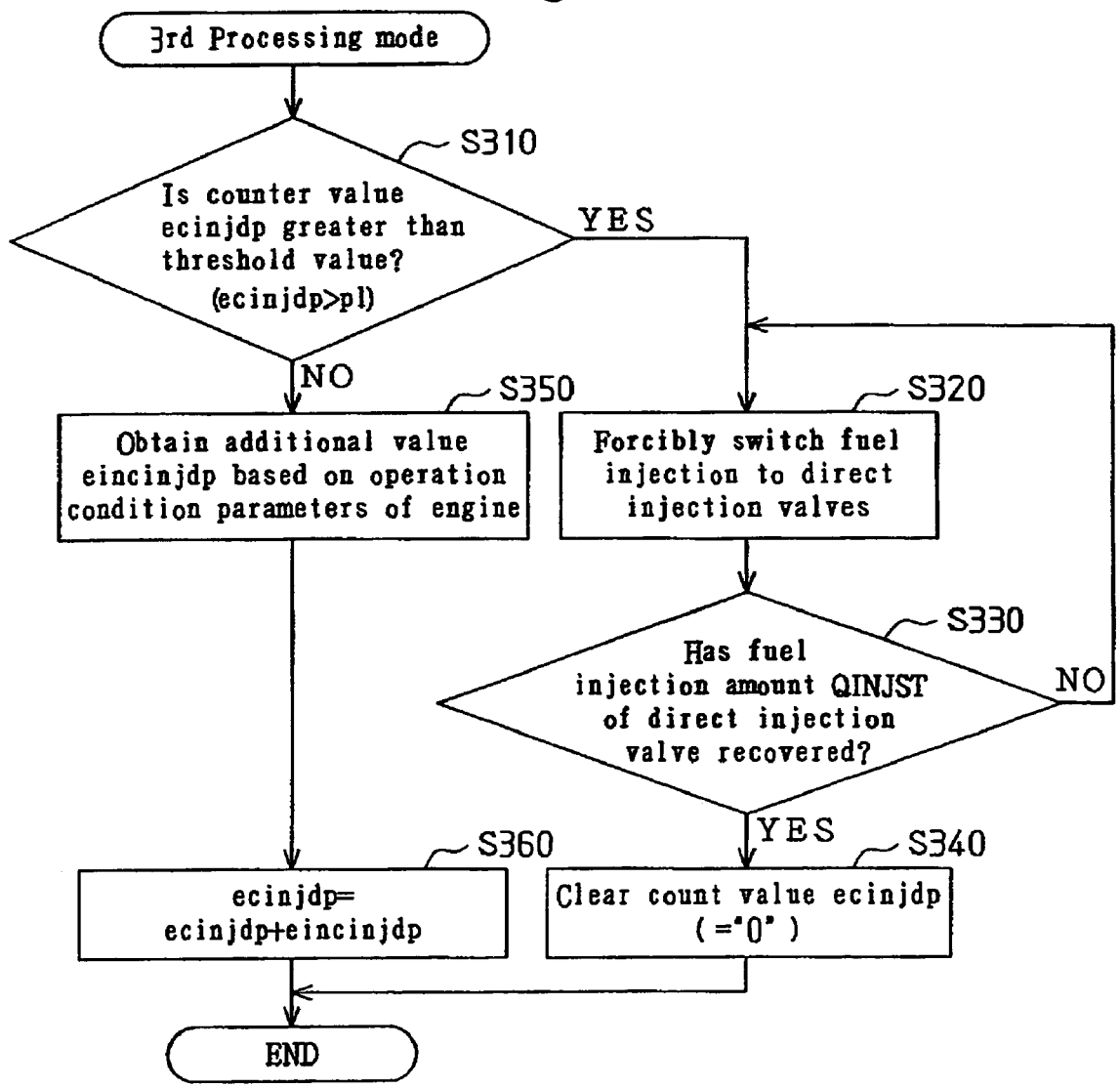
FIG. 5 is a flowchart showing the control routine in a third processing mode of a third embodiment.

FIG. 5 is a flowchart showing the control routine of the third processing mode. In the third processing mode, the ECU 31 estimates the amount of deposits accumulated on the nozzle hole 21a of each direct injection valve 21 when the engine is operating with fuel continuously injected from the port injection valves 22. The ECU 31 performs deposit prevention by forcibly switching the injection valves from the port injection valves 22 to the direct injection valves 21 for a predetermined interval based on this estimation. This control routine is executed by the ECU 31 as an angle interrupt process, for example, at predetermined crank angles.

In the third embodiment, the ECU 31 estimates the deposit accumulation amount based on operation condition parameters (engine operating state) of the internal combustion engine 10 that is correlated with the deposit accumulation amount.

Specifically, the ECU 31 obtains the operation condition parameter of the internal combustion engine 10 and estimates the amount of adhered deposits per unit time collected on the nozzle hole 21a based on this calculated operation condition parameter. The ECU 31 then adds the estimated deposit adhesion amount with a counter (not shown) and records the sum as the deposit accumulation amount.

The operation condition parameter used for the estimation of the deposit accumulation amount is a quantity correlating to the temperature of the nozzle hole 21a and the engine operating combustion conditions. Examples of parameters usable as the operation condition parameter include engine speed detected by the speed sensor 44, engine load detected by the acceleration sensor 41 or speed sensor 44, coolant temperature detected by the coolant temperature sensor 42, and the like. When estimating the deposit accumulation amount, a method using the parameters separately, a method using these parameters in combination, or a method weighting each of the parameters in accordance with the degree of correlation to the deposit accumulation may be employed.

In the control routine of the third processing mode, the ECU 31 performs the switching control to the direct injection valve 21 based on the estimation value of the deposit accumulation amount.

Specifically, when the processing proceeds to this routine as an interrupt process, the ECU 31 determines whether or not the deposit accumulation amount estimated as described above, that is, the count value ecinjdp of the counter, exceeds a predetermined threshold value p1 (step S310).

When it is determined that the count value ecinjdp exceeds the threshold value p1, that is, the condition ecinjdp>p1 is satisfied (step S310: YES), the ECU 31 forcibly switches the injection valves from the port injection valves 22 to the direct injection valves 21 to perform fuel injection with the direct injection valves 21 (step S320).

In the third embodiment, the ECU 31 switches the fuel injection mode such that the direct injection valves 21 corresponding to the cylinders #1 through #4 inject fuel for a predetermined cycle (for example, one cycle). The deposits accumulated on each nozzle hole 21a and adhesion material, such as carbon and the like which cause deposits (non-solids such as deposits), are blasted away by the force of the injection by starting fuel injection with the direct injection valves 21 as described above. In this way, the fuel injection amount QINJST of the direct injection valve 21 recovers to the target value.

After the direct injection valves 21 performs fuel injection, the ECU 31 detects the fuel injection amount QINJST of the injection valve 21 to determine whether or not the injection amount QINJST has recovered to the target value (step S330).

In the same manner as in the first processing mode, the ECU 31 detects the injection amount QINJST by detecting, for example, the change in the air-fuel ratio learned value of the air-fuel mixture formed in the combustion chamber 11.

When it is determined that the fuel injection amount QINJST has recovered to the target value (step S330: YES), the ECU 31 clears the count value ecinjdp of the counter (ecinjdp="0") and ends this process (step S340). However, when it is determined that the fuel injection amount QINJST has not recovered to the target value (step S330: NO), the ECU 31 returns to step S320 so that the direct injection valves 21 corresponding to the cylinders #1 through #4 again inject fuel for one cycle. Thereafter, the ECU 31 again detects the fuel injection amount QINJST in step S330 to determine whether or not the fuel injection amount QINJST has recovered to the target value. The fuel injection amount QINJST recovers to the target value through the control loop of steps S320 and S330.

When it is determined that the count value ecinjdp has not exceeded the threshold value p1 (step S310: NO), the ECU 31 again obtains the count value ecinjdp of the counter based on the operation condition parameters of the internal combustion engine 10. Specifically, the adhesion amount of accumulated deposit on the nozzle hole 21a is estimated based on the operation condition parameter to determine an additional value eicinjdp (step S350). Then, the ECU 31 calculates a new count value ecinjdp by adding the additional value eicinjdp to the present count value ecinjdp (step S360). Thereafter, the ECU 31 temporarily ends this process.

When the process again proceeds to this routine (third processing mode) as an interrupt process, the ECU 31 determines whether or not the count value ecinjdp calculated in step S360 exceeds the threshold value p1 in step S310. When the ECU 31 determines that the count value ecinjdp exceeds the threshold value p1, the injection valve is forcibly switched to the direct injection valves 21 to perform fuel injection with the direct injection valves 21 as described above.

In the third processing mode, when the fuel injection is continuously performed by the port injection valves 22, and the estimated value (count value ecinjdp) of the deposit accumulation amount exceeds the threshold value p1, the injection valves are forcibly switched from the port injection valves 22 to the direct injection valves 21. Accordingly, deposits accumulating on the nozzle hole 21a of each direct injection valve 21 are blasted away by the force of the injection. Furthermore, the heat of fuel vaporization is expelled from the nozzle hole 21a, and the nozzle hole 21a is cooled when the direct injection valve 21 performs fuel injection. As a result, accumulation of new deposits at the nozzle hole 21a is prevented.

In addition to the advantages of the first and second embodiments, the injection controller 50 of the third embodiment has the advantages described below.

(1) When fuel is continuously injected from the port injection valves 22, the ECU 31 estimates the amount of deposit accumulation on the nozzle hole 21a of the direct injection valve 21, and records the estimated value as the count value ecinjdp. When the count value ecinjdp exceeds the threshold value p1, the ECU 31 forcibly switches the injection valves from the port injection valves 22 to the direct injection valves 21, and the direct injection valves 21 corresponding to the cylinders #1 through #4 perform fuel injection for a predetermined cycle (in the present example, one cycle). Accordingly, deposits accumulating on the nozzle hole 21a of the direct injection valve 21 are blasted away by the force of the injection, and the reduced injection amount QINJST recovers to its target value.

(2) Each nozzle hole 21a is cooled by the fuel injection performed by the corresponding direct injection valves 21. Accordingly, the accumulation of new deposits is prevented when the engine stops.

(3) The ECU 31 estimates the deposit accumulation amount based on the operation condition parameters of the internal combustion engine 10. The ECU 31 then switches to the direct injection valves 21 based on the estimated amount (count value ecinjdp). Accordingly, the ECU 31 performs optimal deposit prevention in accordance with the present engine operating conditions.

(4) When the port injection valve 22 performs fuel injection during engine operation, the ECU 31 forcibly switches to the direct injection valves 21 at predetermined cycles until the fuel injection amount QINJST of the direct injection valves 21 recovers to the target value. Accordingly, the effect of adverse combustion caused by the fuel injected by the direct injection valve 21 is significantly reduced.

It should be apparent to those skilled in the art that the present invention may be embodied in many other specific forms without departing from the spirit or scope of the invention. Particularly, it should be understood that the present invention may be embodied in the following forms.

(a-1) In the first embodiment, when the fuel injection amount QINJST (actual fuel injection amount) of the direct injection valve 21 is less than a target value (target injection amount), the ECU 31 forcibly switches to the direct injection valve 21. Alternatively, the ECU 31 also may forcibly switch the injection valve periodically at predetermined intervals regardless of such conditions. In this case, the ECU 31 may perform switching once for every several minutes or may perform switching once for every several cycles. In this way, the effect of adverse combustion that would be caused by normally injecting fuel injected with the direct injection valves 21 is greatly reduced and deposit prevention is performed in an optimal manner.

(a-2) In the third embodiment, the ECU 31 estimates the amount of deposit accumulating on the nozzle hole 21a of each direct injection valve 21. When the estimated accumulation amount (count value ecinjdp) exceeds the threshold value p1, the ECU 31 forcibly switches to the direct injection valves 21. Alternatively, the ECU 31 also may forcibly switch the injection valve periodically at predetermined intervals regardless of such a condition in the same manner as described in modification (a-1).

(a-3) In the first, second, and third embodiments, when forcibly switching from the port injection valves 22 to the direct injection valves 21, the ECU 31 simultaneously switches all the direct injection valves 21 corresponding to the cylinders #1 through #4. Alternatively, the ECU 31 may also switch valves so that only one or a limited number of the direct injection valves 21 (in this case, four valves) are switched at the same time. That is, the ECU 31 may shift the direct injection valves 21 performing fuel injection. In this way, the effect of adverse combustion caused when normally injecting fuel with the direct injection valves 21 is significantly reduced, and deposit prevention is performed in an optimal manner. Since only some (for example, one) of the direct injection valves 21 inject fuel, torque is not affected.

(a-4) When controlling periodic (every several minutes or every several cycles) switching based on predetermined intervals, as in modifications (a-1) and (a-2), the ECU 31 also may sequentially switch only some of the valves at a time so as to shift the valves performing fuel injection in the same manner as in modification (a-3).

In the first and third embodiments, when forcibly switching from the port injection valves 22 to the direct injection valves 21, the ECU 31 controls the fuel injection of the direct injection valves 21 corresponding to the cylinders #1 through #4 for one cycle. Alternatively, the direct injection valves 21 corresponding to the cylinders #1 through #4 also may perform fuel injection for two cycles. Another alternative is that the fuel injection may be performed for more than two cycles insofar as adverse combustion does not occur.

Fuel injection by the direct injection valves 21 may be performed over a fixed period.

The injection controller of the present invention requires only at least one of the control routines corresponding to the first through third processing modes.

The present examples and embodiments are to be considered as illustrative and not restrictive, and the invention is not to be limited to the details given herein, but may be modified within the scope and equivalence of the appended claims.

What is claimed is:

1. A controller for controlling the injection of fuel in an internal combustion engine including a cylinder and an intake passage connected to the cylinder, the controller comprising:
   a direct injection valve for injecting fuel into the cylinder;
   an intake passage injection valve for injecting fuel into the intake passage; and
   a control unit, connected to the direct injection valve and the intake passage injection valve, for executing a first fuel injection mode with the direct injection valve and a second fuel injection mode with the intake passage injection valve, the control unit switching injection modes from the second fuel injection mode to the first fuel injection mode for a predetermined period when fuel is to be injected in the second fuel injection mode where a pre-existing condition in which deposits are likely accumulated on the direct injection valve exists.

2. The controller of claim 1, wherein:
the direct injection valve includes a nozzle hole for injecting fuel;
the control unit switches the fuel injection mode from the second fuel injection mode to the first fuel injection mode for a predetermined period when fuel is to be injected in the second fuel injection mode under the pre-existing condition in which temperature of the nozzle hole of the direct injection valve or temperature of the fuel is less than or equal to a predetermined temperature; and
the deposits are likely accumulated on the nozzle hole of the direct injection valve.

3. The controller of claim 1, wherein the control unit is connected to an ignition switch and switches the fuel injection mode from the second fuel injection mode to the first fuel injection mode for a predetermined period when fuel is to be injected in the second fuel injection mode under the pre-existing condition in which the ignition switch is turned ON.

4. The controller of claim 1, wherein the control unit is connected to an ignition switch and switches the fuel injection mode from the second fuel injection mode to the first fuel injection mode for a predetermined period when fuel is to be injected in the second fuel injection mode under the pre-existing condition which is after the ignition switch is turned OFF and until the engine stops.

5. The controller of claim 1, wherein the control unit detects whether or not the fuel injection amount of the direct injection valve is less than a target injection amount, and the control unit switches the fuel injection mode from the second fuel injection mode to the first fuel injection mode for a predetermined period when fuel is to be injected in the second fuel injection mode under the pre-existing condition in which the fuel injection amount of the direct injection valve is less than the target injection amount.

6. The controller of claim 1, wherein the control unit periodically switches the fuel injection mode from the second fuel injection mode to the first fuel injection mode for a predetermined period when fuel is to be injected in the second fuel injection mode.

7. The controller of claim 1, wherein:
the cylinder is one of a plurality of cylinders in the engine;
the direct injection valve is one of a plurality of direct injection valves respectively corresponding to the plurality of cylinders; and
the control unit switches the fuel injection mode from the second fuel injection mode to the first fuel injection mode in some of the plurality of direct injection valves for a predetermined period when fuel is to be injected in the second fuel injection mode under the pre-existing condition which is while shifting the direct injection valves performing fuel injection.

8. The controller of claim 1, wherein:
the direct injection valve includes a nozzle hole for injecting fuel; and
the control unit estimates the amount of deposit accumulation on the nozzle hole of the direct injection valve based on an engine operation condition parameter, the control unit switching the fuel injection mode from the second fuel injection mode to the first fuel injection mode for a predetermined period when fuel is to be injected in the second fuel injection mode under the pre-existing condition in which the estimated amount of deposit accumulation exceeds a predetermined value.

9. The controller of claim 8, wherein the control unit estimates the amount of deposit accumulation by adding the amount of deposit accumulated on the nozzle hole per unit time based on the engine operation condition parameter.

10. The controller of claim 8, wherein the engine operation condition parameter corresponds to at least one of engine speed, engine load, and coolant temperature.

11. A method for controlling fuel injection in an internal combustion engine including a cylinder and an intake passage connected to the cylinder, the method comprising:
executing a first fuel injection mode for injecting fuel into a cylinder with a direct injection valve;
executing a second fuel injection mode for injecting fuel into the intake passage with an intake passage injection valve; and
switching fuel injection modes from the second fuel injection mode to the first fuel injection mode for a predetermined period when fuel is to be injected in the second fuel injection mode where a pre-existing condition in which deposits are likely accumulated on the direct injection valve exists.

12. A controller for controlling the injection of fuel in an internal combustion engine including a cylinder and an intake passage connected to the cylinder, the controller comprising:
a direct injection valve for injecting fuel into the cylinder, the direct injection valve including a nozzle hole for injecting fuel;
an intake passage injection valve for injecting fuel into the intake passage; and
a control unit, connected to the direct injection valve and the intake passage injection valve, for executing a first fuel injection mode with the direct injection valve and a second fuel injection mode with the intake passage injection valve, the control unit estimating the amount of deposit accumulation on the nozzle hole of the direct injection valve based on an engine operation condition parameter, and the control unit switching the fuel injection mode from the second fuel injection mode to the first fuel injection mode for a predetermined period when fuel is to be injected in the second fuel injection mode if the estimated amount of deposit accumulation exceeds a predetermined value.

* * * * *